(12) United States Patent  
Ball et al.

(10) Patent No.: US 10,963,864 B2
(45) Date of Patent: Mar. 30, 2021

(54) SMART CARD WITH VERIFICATION MEANS

(75) Inventors: David Ball, Victoria (AU); Simon Hewitt, Victoria (AU)

(73) Assignee: SCRAMCARD HOLDINGS (HONG KONG) LIMITED, Sheung Wan (HK)

( * ) Notice: Subject to any disclaimer, the term of this patent is extended or adjusted under 35 U.S.C. 154(b) by 1104 days.

(21) Appl. No.: 13/984,071

(22) PCT Filed: Feb. 7, 2012

(86) PCT No.: PCT/AU2012/000110
§ 371 (c)(1),
(2), (4) Date: Sep. 24, 2013

(87) PCT Pub. No.: WO2012/106757
PCT Pub. Date: Aug. 16, 2012

(65) Prior Publication Data
US 2014/0330726 A1  Nov. 6, 2014

(30) Foreign Application Priority Data

Feb. 7, 2011 (AU) ................................ 2011900380
Feb. 7, 2011 (AU) ................................ 2011900381

(51) Int. Cl.
*G06Q 20/34* (2012.01)
*G06F 21/34* (2013.01)
(Continued)

(52) U.S. Cl.
CPC ........... *G06Q 20/341* (2013.01); *G06F 21/34* (2013.01); *G06Q 20/385* (2013.01);
(Continued)

(58) Field of Classification Search
None
See application file for complete search history.

(56) References Cited

U.S. PATENT DOCUMENTS 5,594,227 A * 1/1997 Deo ..................... G06Q 20/341
235/380
6,163,771 A * 12/2000 Walker ................... G06Q 20/04
705/18

(Continued)

FOREIGN PATENT DOCUMENTS

WO 02/060210 8/2002
WO WO-2012103210 A2 * 8/2012 ........... H04L 9/3242

OTHER PUBLICATIONS

Longley, D., Shain, M., & Caelli, W. (1992). Information Security Dictionary of Concepts, Standards and Terms. Retrieved from https://books.google.com/books?id=pTexCwAAQBAJ&printsec=frontcover#v=onepage&q&f=false.*

(Continued)

*Primary Examiner* — El Mehdi Oussir
(74) *Attorney, Agent, or Firm* — AEON Law, PLLC; Adam L. K. Philipp; Martin S. Garthwaite (57) ABSTRACT

The present invention is directed to a smartcard that enables a one-time pin code offline security authentication with a card reader. This is achieved by generating a one-time pin code when the user inputs their pin code. The inputted pin code is encrypted and matched with the encrypted user correct pin code. If there is a match the one-time pin code is stored in memory and the transaction can proceed.

20 Claims, 5 Drawing Sheets (51) Int. Cl.
  *G07F 7/10* (2006.01)
  *G07F 7/08* (2006.01)
  *G06Q 20/38* (2012.01)
  *G06Q 20/40* (2012.01)
  *H04L 9/32* (2006.01)

(52) U.S. Cl.
  CPC ..... *G06Q 20/3829* (2013.01); *G06Q 20/4012* (2013.01); *G07F 7/0846* (2013.01); *G07F 7/0853* (2013.01); *G07F 7/1025* (2013.01); *G07F 7/1066* (2013.01); *G07F 7/1091* (2013.01); *H04L 9/3228* (2013.01); *G06Q 2220/00* (2013.01)

(56) References Cited

U.S. PATENT DOCUMENTS

| | | | | |
|---|---|---|---|---|
| 7,363,504 | B2* | 4/2008 | Bonalle | G06F 21/32 380/227 |
| 2002/0023217 | A1* | 2/2002 | Wheeler | G06Q 20/02 713/171 |
| 2002/0026575 | A1* | 2/2002 | Wheeler | H04L 63/0823 713/156 |
| 2002/0198848 | A1* | 12/2002 | Michener | G06Q 20/04 705/75 |
| 2003/0005310 | A1* | 1/2003 | Shinzaki | G07C 9/257 713/186 |
| 2003/0101136 | A1* | 5/2003 | Wheeler | G06Q 20/341 705/42 |
| 2004/0215964 | A1* | 10/2004 | Barlow | G06Q 20/40 713/172 |
| 2005/0010786 | A1* | 1/2005 | Michener | G06F 21/34 713/185 |
| 2005/0069137 | A1* | 3/2005 | Landrock | G06Q 20/341 380/278 |
| 2007/0277044 | A1* | 11/2007 | Graf | G07F 7/1008 713/185 |
| 2009/0134218 | A1 | 5/2009 | Yuzon et al. | |
| 2009/0200371 | A1 | 8/2009 | Kean et al. | |
| 2010/0319058 | A1 | 12/2010 | Chen | |
| 2011/0258452 | A1* | 10/2011 | Coulier | G06F 21/31 713/171 |
| 2011/0276495 | A1* | 11/2011 | Varadarajan | G06F 21/31 705/71 |
| 2013/0198519 | A1* | 8/2013 | Marien | G06F 21/34 713/172 |
| 2014/0358777 | A1* | 12/2014 | Gueh | G06Q 20/1085 705/43 |
| 2015/0106275 | A1* | 4/2015 | Wolfs | G06Q 20/20 705/72 |

OTHER PUBLICATIONS

Breekell, J. v. (2016). EMV in a nutshell. EMV in a nutshell. Retrieved from file:///C:/Users/eoussir/Documents/e-Red%20Folder/13984071/NPL_EMVtechreport_2016.pdf (Year: 2016).*
Ren-Chiun Wang, W.-S. J.-L. (2011). Robust authentication and key agreement scheme preserving. (Computer Communications 34 (2011) 274-280). Retrieved from https://www.sciencedirect.com/science/article/pii/S0140366410001738 (Year: 2011).*
Office Action for corresponding Chinese Application No. 201280007900.8 dated Dec. 16, 2015.
Office Action for corresponding Australian patent application No. 2012214100 dated Mar. 18, 2016.
Second Office Action for corresponding Chinese Application No. 201280007900.8.
European Search Report dated Jul. 22, 2014 for corresponding patent application No. EP 12 744 484.2.
https://en.wikipedia.org/wiki/EMV dated Sep. 7, 2013.

* cited by examiner

SMART CARD WITH VERIFICATION MEANS

CROSS-REFERENCE TO RELATED APPLICATION

This application is a national phase of International Patent Application No. PCT/AU2012/000110 filed Feb. 7, 2012, which is incorporated herein by reference in its entirety, and which claims the priority filing benefit of Australian Patent Application Nos. 2011900380 and 2011900381 filed Feb. 7, 2011.

FIELD OF THE INVENTION

This invention relates to security authentication devices. In particular, the invention relates to smartcards, smart credit cards and a method for enabling offline security authentication with a card reader, and to a microprocessor program product for a smartcard.

BACKGROUND OF THE INVENTION

Broadly, a smartcard is a pocket-sized card with embedded integrated circuits. The smartcard typically includes a microprocessor that is interfaced with peripheral microprocessor components such as memory, a contact data I/O terminal, and/or user interface components such as a key pad and a display.

A smartcard that is used as a smart credit card can increase security authentication over traditional visual security authentication methods. For example, a smart credit card can store a PIN code. The smart credit card can then be inserted into a card reader which requires a user to enter the PIN code into the reader. The card reader then compares the entered PIN code with the stored PIN code on the smart credit card, and if they match a transaction is authorised. This method in which the card reader authenticates the smart credit card is also referred to as offline authentication.

Keystroke logging however is still a security risk. A user's PIN can be obtained from a keypad of a card reader at a point of sale (POS) system, an ATM, or the like. There are numerous keystroke logging methods, ranging from hardware and software-based approaches to electromagnetic and acoustic analysis.

OBJECT OF THE INVENTION

It is an object of the present invention to provide an alternative smartcard that at least reduces security authentication risks that are associated with smartcards.

SUMMARY OF THE INVENTION

In another aspect the invention provides a smartcard that enables security authentication prior to transfer of stored information, smartcard including:

a microprocessor that is interfaced with memory, a user interface which includes code input keys and a display, and a proximity communication interface or input/output contact terminal for interfacing with a card reader; and an encrypted digest of a user PIN stored in memory, which encrypted digest has been generated with an encryption algorithm;

the smartcard being configured for:

receiving an input PIN code from the code input keys;

generating and displaying a command where there is a proximity communication interface or one-time PIN code where there is an input/output contact terminal on the display in response to receiving the input PIN code from the code input keys;

determining if the input PIN code matches the user PIN code by generating an encrypted digest of the input PIN code with the same encryption algorithm with which the stored digest has been created and by comparing the generated encrypted digest with the stored one-way encrypted digest; and wherein if the generated encrypted digest matches the stored encrypted digest and there is a proximity communication interface, then activating the proximity communication interface to transfer the stored information to the card reader or if the generated encrypted digest matches the stored encrypted digest and there is an input/output contact terminal, then storing the one-time PIN code in the memory, which one-time PIN code is used to authenticate the smartcard with the card reader.

In another aspect the invention provides a smartcard that enables one-time PIN code offline security authentication with a card reader, the smartcard including:

a microprocessor that is interfaced with memory, a user interface which includes code input keys and a code display, and an input/output contact terminal for interfacing with the card reader; and an encrypted digest of a user PIN stored in memory, which encrypted digest has been generated with an encryption algorithm;

the smartcard being configured for:

receiving an input PIN code from the code input keys;

generating and displaying a one-time PIN code on the display in response to receiving the input PIN code from the code input keys;

determining if the input PIN code matches the user PIN code by generating an encrypted digest of the input PIN code with the same encryption algorithm with which the stored digest has been created and by comparing the generated encrypted digest with the stored encrypted digest; and if the generated encrypted digest matches the stored encrypted digest, then storing the one-time PIN code in the memory, which one-time PIN code is used in the offline security authentication of the smartcard by the card reader.

In another aspect the invention provides a smartcard that enables one-time PIN code offline security authentication with a card reader, the smartcard including:

a microprocessor that is interfaced with memory, a user interface which includes code input keys and a code display, and an input/output contact terminal for interfacing with the card reader; and a one-way encrypted digest of a user PIN stored in memory, which one-way encrypted digest has been generated with an one-way encryption algorithm;

the smartcard being configured for:

receiving an input PIN code from the code input keys;

generating and displaying a one-time PIN code on the display in response to receiving the input PIN code from the code input keys;

determining if the input PIN code matches the user PIN code by generating a one-way encrypted digest of the input PIN code with the same one-way encryption algorithm with which the stored one-way digest has been created and by comparing the generated one-way encrypted digest with the stored one-way encrypted digest; and if the generated one-way encrypted digest matches the stored one-way encrypted digest, then storing the one-time PIN code in the memory, which one-time PIN code is used in the offline security authentication of the smartcard by the card reader.

The smartcard is preferably configured to reset the stored one-time PIN code in memory to an invalid value after a predetermined condition is met. The predetermined condition preferable includes any one of lapsing of a predetermined time, deactivating of the display, and detecting with the microprocessor that the one-time PIN has been used in an authentication process.

The smartcard is preferably configured to include a PIN failure counter in memory, so that if an invalid PIN is entered with the code input keys and the generated one-way encrypted digest does not match the stored one-way encrypted digest, the PIN failure counter is increased. In addition, the smartcard is preferably configured to reset the one-time PIN code in memory to an invalid value each time that an invalid PIN code is entered with the code input keys, for example to erase an one-time PIN code which is still resident in memory at such time.

The smartcard is preferably configured to lock or deactivate at least some of its functionality if the PIN failure counter reaches a predetermined count.

The smartcard preferably includes a PIN failure counter reset or smartcard unlock function, in which the smartcard is configured to receive an one-time unlock code from the code input keys, to process and validate the one-time unlock code, and to unlock or reactivate the locked or deactivated functions of the smartcard if the one-time unlock code is successfully processed and validated.

The smartcard is also preferably configured to reset the PIN failure counter to zero each time a valid PIN code is entered prior to the PIN failure counter reaching its predetermined count.

In one embodiment, the smartcard is preferably configured to include a stored PIN code replacement function, which when activated by entering an associated code, processes the associated code to generate a new one-way encrypted digest that is stored on the smartcard to replace the existing one-way encrypted digest.

The smartcard is preferably a smart credit card.

The smartcard is preferably configured to communicate with a card reader in accordance with the Europay, MasterCard and VISA (EMV) protocol.

In a further aspect the invention provides a method for enabling one-time PIN code offline security authentication of a smartcard with a card reader, which smartcard includes a microprocessor that is interfaced with memory, a user interface which includes code input keys and a code display, and a input/output contact terminal, the method including:
storing a one-way encrypted digest of a user PIN code in the memory, which one-way encrypted digest has been generated with an one-way encryption algorithm;
receiving an input PIN code from the code input keys;
generating and displaying a one-time PIN code on the display in response to receiving the input PIN code from the code input keys;
determining if the input PIN code matches the user PIN code by generating a one-way encrypted digest of the input PIN code with the same one-way encryption algorithm with which the stored one-way digest has been created and by comparing the generated one-way encrypted digest with the stored one-way encrypted digest; and
if the generated one-way encrypted digest matches the stored one-way encrypted digest, then storing the one-time PIN code in the memory, which one-time PIN code is used in the offline security authentication of the smartcard by the card reader.

The method preferably includes resetting the one-time PIN code in memory to an invalid value after a predetermined time has lapsed, or when the display deactivates, or if the microprocessor detects that the one-time PIN has been used in an authentication process.

The method preferably include increasing a PIN failure counter in memory if an invalid PIN is entered with the code input keys and the generated one-way encrypted digest does not match the stored one-way encrypted digest.

The method preferably includes resetting the one-time PIN code in memory to an invalid value each time that an invalid PIN code is entered with the code input keys if an one-time PIN code was still resident in memory at such time.

The method preferably includes deactivating at least some of its functionality if the PIN failure counter reaches a predetermined count.

The method preferably includes resetting the PIN failure counter with a PIN failure reset function by receiving an one-time unlock code from the code input keys, processing and validating the one-time unlock code, and by reactivating the one-time pin generation function if the one-time unlock code is successfully processed and validated.

The method preferably includes resetting the PIN failure counter to zero each time a valid PIN code is entered prior to the PIN failure counted reaching its predetermined count.

The method preferably includes replacing the existing one-way encrypted digests with a stored PIN code replacement algorithm by receiving an associated code from the code key pad, processing the associated code to generate a new one-way encrypted digest, and overriding the existing one way encrypted digest.

In another aspect of the invention there is provided a smartcard microprocessor program product which includes microprocessor readable instructions, which when executed, causes the smartcard to perform the method as defined according to the abovementioned method of the invention.

In another aspect the invention provides a proximity smartcard that enables security authentication prior to transfer of stored information from the proximity smart card to the proximity card reader, the proximity smartcard including:
a microprocessor that is interfaced with memory, a user interface which includes code input keys and a display, and an proximity communication interface; and
an encrypted digest of a user PIN stored in memory, which encrypted digest has been generated with an encryption algorithm;
the proximity smartcard being configured for:
receiving an input PIN code from the code input keys;
generating and displaying a command on the display in response to receiving the input PIN code from the code input keys;
determining if the input PIN code matches the user PIN code by generating an encrypted digest of the input PIN code with the same encryption algorithm with which the stored digest has been created and by comparing the generated encrypted digest with the stored one-way encrypted digest; and
if the generated encrypted digest matches the stored encrypted digest, then activating the proximity communication interface to transfer the stored information to the proximity card reader.

In another aspect the invention provides a proximity smartcard that enables security authentication prior to transfer of stored information from the proximity smart card to the proximity card reader, the proximity smartcard including:

a microprocessor that is interfaced with memory, a user interface which includes code input keys and a display, and an proximity communication interface; and a one-way encrypted digest of a user PIN stored in memory, which one-way encrypted digest has been generated with an one-way encryption algorithm;

the proximity smartcard being configured for:

receiving an input PIN code from the code input keys;

generating and displaying a command on the display in response to receiving the input PIN code from the code input keys;

determining if the input PIN code matches the user PIN code by generating a one-way encrypted digest of the input PIN code with the same one-way encryption algorithm with which the stored one-way digest has been created and by comparing the generated one-way encrypted digest with the stored one-way encrypted digest; and if the generated one-way encrypted digest matches the stored one-way encrypted digest, then activating the proximity communication interface to transfer the stored information to the proximity card reader.

The proximity smartcard is preferably configured to deactivate the proximity communication interface after a predetermined condition is met. The predetermined condition preferable includes lapsing of a predetermined time.

The proximity smartcard preferably includes a PIN failure counter in memory, so that if an invalid PIN is entered with the code input keys and the generated one-way encrypted digest does not match the stored one-way encrypted digest, the PIN failure counter is increased.

The proximity smartcard is preferably configured to lock or deactivate at least some of its functionality if the PIN failure counter reaches a predetermined count, for example, to deactivate the proximity communication interface.

The proximity smartcard is preferably includes a PIN failure counter reset or proximity smartcard unlock function, in which the proximity smartcard is configured to receive an one-time unlock code from the code input keys, to process and validate the one-time unlock code, and to unlock or reactivate the locked or deactivated functions of the proximity smartcard if the one-time unlock code is successfully processed and validated.

The proximity smartcard is also preferably configured to reset the PIN failure counter to zero each time a valid PIN code is entered prior to the PIN failure counter reaching its predetermined count.

In one embodiment, the proximity smartcard is preferably configured to include a stored PIN code replacement function, which when activated by entering an associated code, processes the associated code to generate a new one-way encrypted digest that is stored on the proximity smartcard to replace the existing one-way encrypted digest.

The proximity smartcard is preferably a proximity smart credit card.

The proximity smartcard is preferably configured to communicate with a card reader in accordance with the Visa PayWave and/or Mastercard PayPass protocol.

In a second aspect the invention provides a method for enabling security authentication prior to transfer of stored information from the proximity smart card to a proximity card reader, which proximity smartcard includes a microprocessor that is interfaced with memory, a user interface which includes code input keys and a code display, and a proximity communication interface, the method including:

storing a one-way encrypted digest of a user PIN code in the memory, which one-way encrypted digest has been generated with an one-way encryption algorithm;

receiving an input PIN code from the code input keys;

generating and displaying a command on the display in response to receiving the input PIN code from the code input keys;

determining if the input PIN code matches the user PIN code by generating a one-way encrypted digest of the input PIN code with the same one-way encryption algorithm with which the stored one-way digest has been created and by comparing the generated one-way encrypted digest with the stored one-way encrypted digest; and if the generated one-way encrypted digest matches the stored one-way encrypted digest, then activating the proximity communication interface to transfer the stored information to the proximity card reader.

The method preferably includes deactivating the proximity communication interface after a predetermined time has lapsed.

The method preferably includes increasing a PIN failure counter in memory if an invalid PIN is entered with the code input keys and the generated one-way encrypted digest does not match the stored one-way encrypted digest.

The method preferably includes deactivating at least some of the proximity smartcard functionality if the PIN failure counter reaches a predetermined count.

The method preferably includes resetting the PIN failure counter with a PIN failure reset function by receiving an one-time unlock code from the code input keys, processing and validating the one-time unlock code, and by reactivating the deactivated smartcard functions if the one-time unlock code is successfully processed and validated.

The method preferably includes resetting the PIN failure counter to zero each time a valid PIN code is entered prior to the PIN failure counted reaching its predetermined count.

The method preferably includes replacing the existing one-way encrypted digests with a stored PIN code replacement algorithm by receiving an associated code from the code key pad, processing the associated code to generate a new one-way encrypted digest, and overriding the existing one way encrypted digest.

In yet another aspect of the invention there is provided a proximity smartcard microprocessor program product which includes microprocessor readable instructions, which when executed, causes the proximity smartcard to perform the method as defined according to the second aspect of the invention.

BRIEF DESCRIPTION OF THE DRAWINGS

In order that the present invention can be more readily understood reference will now be made to the accompanying drawings which illustrate a preferred embodiment of the invention and wherein.

DETAILED DESCRIPTION OF THE PREFERRED EMBODIMENTS

With reference to the FIGS. 1 to 4, there is shown the first preferred embodiment. Smartcard 10 enables one-time PIN code offline security authentication with a card reader 12.

Figure 1:
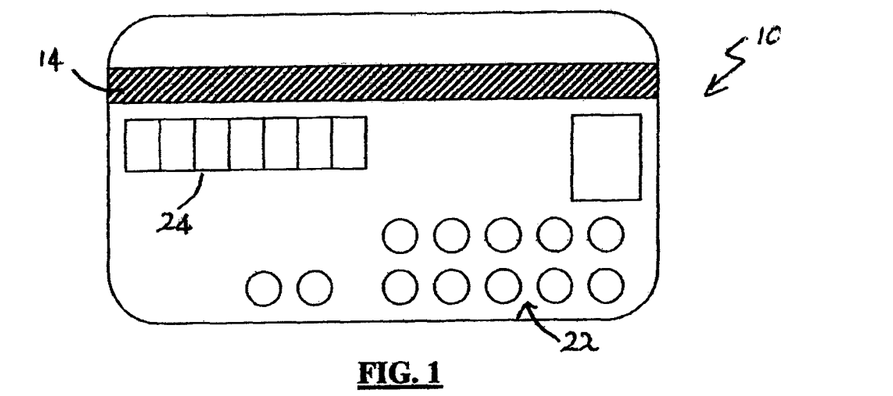
FIG. 1 is a diagrammatic plan view of a smartcard in accordance with the first preferred embodiment of the invention.
Figure 2:
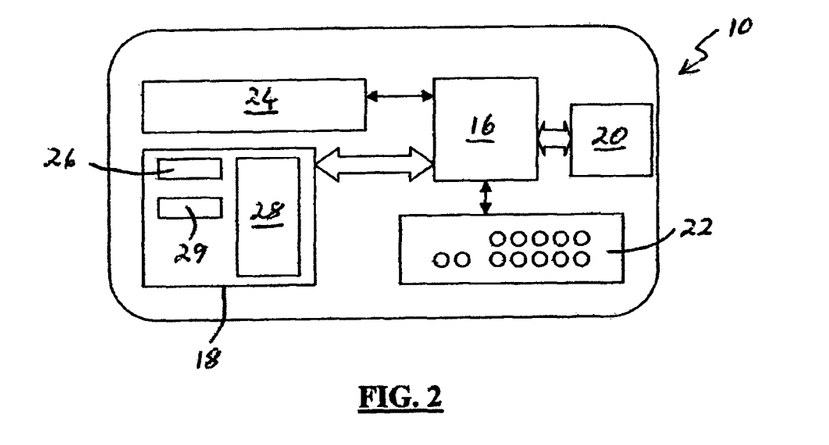
FIG. 2 is a schematic functional block diagram showing some of the components of the smartcard shown in FIG. 1.

Referring to FIGS. 1 and 2, the smartcard 10 in this embodiment is a smart credit card that includes a rectangular-shaped flat pocket-sized body and a magnetic strip 14 that extends across the body.

The smart credit card 10 also includes embedded integrated circuits, which includes a microprocessor 16 that is interfaced with peripheral microprocessor components such as memory 18, a data I/O terminal 20, and user interface components which includes a key pad 22 and display 24.

A person skilled in the art will appreciate that the microprocessor can be any suitable central processing unit (CPU), and the memory can include read only memory (ROM) for carrying an operating system and built-in programs loaded at the time the card chip is manufactured and/or configured. The memory can also include non-volatile memory such as electrically erasable programmable read only Memory (EE-PROM) used for storing data and/or a microprocessor program product 28 which is executed by the processor. The smart credit card 10 can further include volatile memory, such as random access memory (RAM) used for temporary storage of data.

A card operating system can also reside in the processor and memory for controlling execution of the program products, reading and writing of data to memory, and general low-level functions, such as power on and power off.

The smart credit card 10 also includes a data communication interface in the form of input/output contact terminals 20 in the form of flat metal electrodes to interface with contact terminals of the card reader 12.

Figure 4:
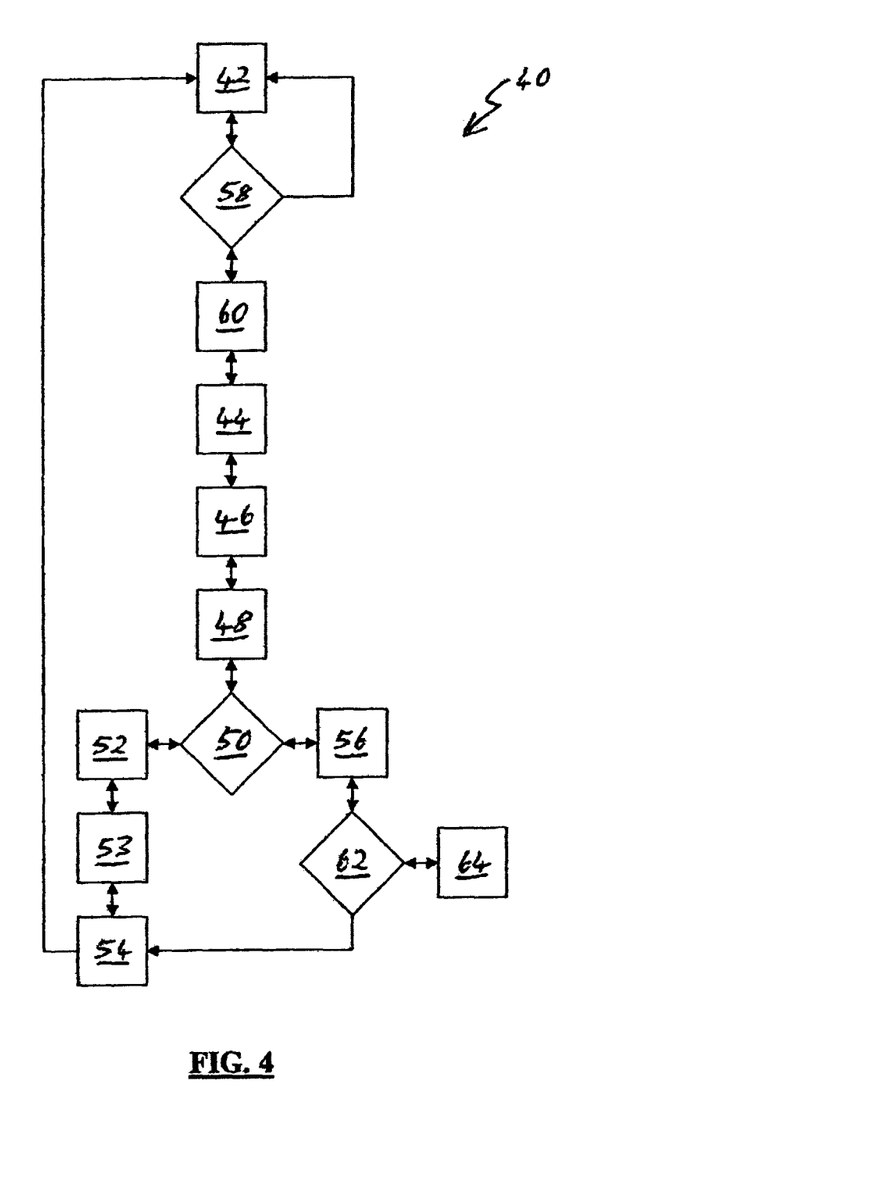
FIG. 4 shows a functional flow diagram of a microprocessor program product that forms part of the smartcard in the first preferred embodiment shown in FIG. 1.

Referring to FIG. 4, a functional flow diagram 40 is shown of the microprocessor program product (card application) 28 which includes microprocessor executable instructions and which is stored in memory 18. When the card application 28 is executed it configures the smart credit card 10 in a way that enables one-time PIN code offline security authentication with the card reader 12, as is explained in more detail below.

The smart credit card 10 includes a one-way encrypted digest 26 that is stored in memory 18. The one-way encrypted digests 26 was created from a user personal identification number (PIN) code. The one-way encrypted digest 26 is in the form of a hash value that has been generated with a hash encryption algorithm and stored in memory 18 when the smart credit card 10 was configured by the card issuer which in this case is a bank. It will be noted that the user PIN code is not stored on the smart credit card 10, but rather a corresponding hash value of the user PIN code is stored on the smart credit card 10.

When a user wishes to make a purchase transaction with the smart credit card 10, then the user enters an input PIN code with the key pad 22. The smart credit card 10 receives, at 42, the input PIN code.

At 58, the smart credit card 10 checks if the smartcard 10 is locked or open. If the smart credit card 10 is open, then, at 60, a PIN failure counter is cleared. The locked and open function of the smart credit card 10 and the role of the PIN failure counter is explained in more detail below.

If the smart credit card 10 is open, then it generates, at 44, a one-time PIN code which is displayed, at 46, on the display 24.

The card application then determines if the entered input PIN code is valid. That is it determines if the input PIN code is actually the user PIN code or if it is an invalid PIN code that was entered, by generating, at 48, a one-way encrypted hash value of the input PIN code by using the same one-way hash algorithm that was used to generate the stored one-way hash value.

At 50, the generated one-way hash value is compared with the stored one-way hash value.

Figure 3:
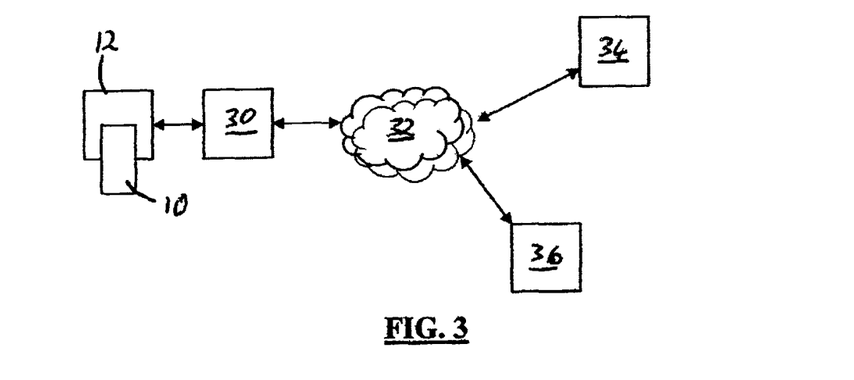
FIG. 3 is a schematic diagram of a data communication network which includes a terminal card reader.

If the generated one-way hash value matches the stored one-way value, then it indicates that the entered user PIN is the same as the user PIN code and therefore valid, and the displayed one-time PIN code is stored, at 52, in the memory 18. The now stored one-time PIN code record 29 is the actual PIN code that is then used by the user and the card reader 12 for offline security authentication of the smart credit card 10 by the card reader 12. When the card reader 12 authenticates the stored one-time PIN then the transaction proceeds from the point-of-sale system 30 over the data communication network 32 to the bank's computer system 34.

The one-time PIN code record 29 is only temporarily stored and available on the smart credit card 10, and a timer is activated, at 53, which when it times out, erases the one-time PIN code, at 54. In this embodiment a 30 second time is used after which the one-time PIN code is erased from memory 18. However, other predetermined conditions can also be used for example when the display 22 deactivates, or if the microprocessor 16 detects that the one-time PIN code has been used in an authentication process.

Each time a user wishes to use the smart credit card 10 with a card reader 12, the user has to enter the user PIN to generate a new one-time PIN code that is used for security authentication by the card reader 12.

If the smart credit card 10 determines, at 50, that an invalid user PIN is entered into the smart credit card 10, then a PIN failure counter in memory is increased, at 56. That is, if the generated hash value of the input PIN code does not match the stored hash value. At 62, the counter is checked, and if the counter has not reached a predetermined cut-off count, then the smart credit card 10 proceeds and ensures that the one-time PIN value is reset, at 54, to an invalid value, so that the smartcard can not be used with the card reader 12 to authenticate a transaction. This gives a user a couple of chances to enter the valid user PIN code.

If the PIN failure counter, however, has reached its predetermined count, at 62, then the smartcard is locked at 64, for example the function that stores the one-time PIN code can be deactivated.

If the smart credit card 10 determines, at 58, that the smart credit card is actually locked when receiving an input PIN code, then another check can be performed, at 58, to reset the PIN failure counter and unlock the smart credit card. That is to facilitate a function in which the user can unlock the smart credit card 10.

For example, a user or card holder can obtain an one-time unlock code from the card issuer, say from the bank, with a personal computer 36 over the Internet 32, after an appropriate identification check, or by any other approved method of the bank. The one-time unlock code can be entered with the code input keys 22. The one-time unlock code is then checked and processed, at 58, and if the one-time unlock code is validated, then the PIN failure counter is reset, at 60, so that normal functionally of the smart credit card 10 can resume.

In another embodiment (not shown) a smart credit card can be configured to include a stored PIN code replacement algorithm, which when activated by entering an associated code, processes the associated code to generate a new one-way hash value for a new user PIN, which is then stored on the smartcard to replace the existing one-way encrypted digest.

Figure 9:
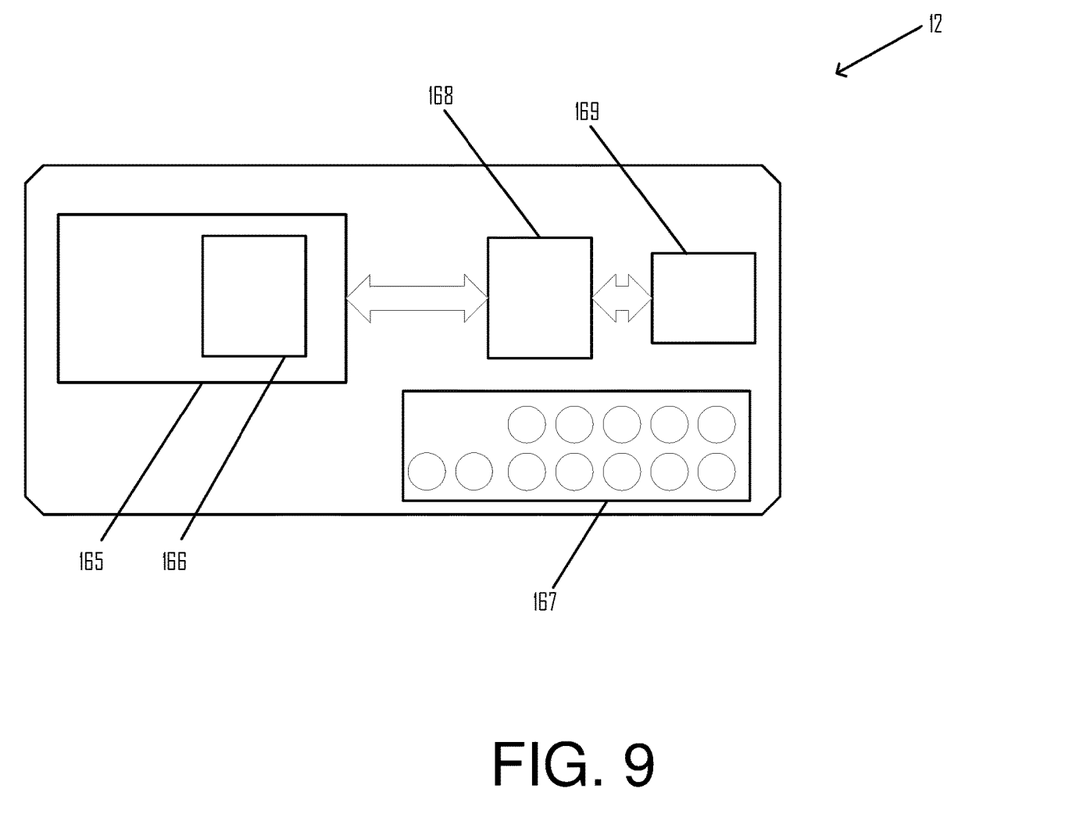
FIG. 9 is a schematic functional block diagram showing some of the components of the card reader shown in FIG. 3.

In this embodiment, the smart credit card 10 is configured to communicate with a card reader 12 in accordance with the Europay, MasterCard and VISA (EMV) protocol. Referring to FIG. 9, card reader 12 includes input/output contact terminals 169 to interface with a data communication interface of smart credit card 10, a card reader keypad 167, embedded integrated circuits of the card reader, which include a card reader microprocessor 168 that is interfaced with peripheral microprocessor components of the card reader, such as card reader memory 165, and card reader instructions 166 in card reader memory 166 which cause card reader 12 to interact with the smart credit card in accordance with the Europay, MasterCard and VISA (EMV) protocol.

With reference to the FIGS. 5 to 8, there is shown the second preferred embodiment, where a proximity smartcard 110 enables security authentication prior to transfer of stored information from the proximity smart card to the proximity card reader.

Figure 5:
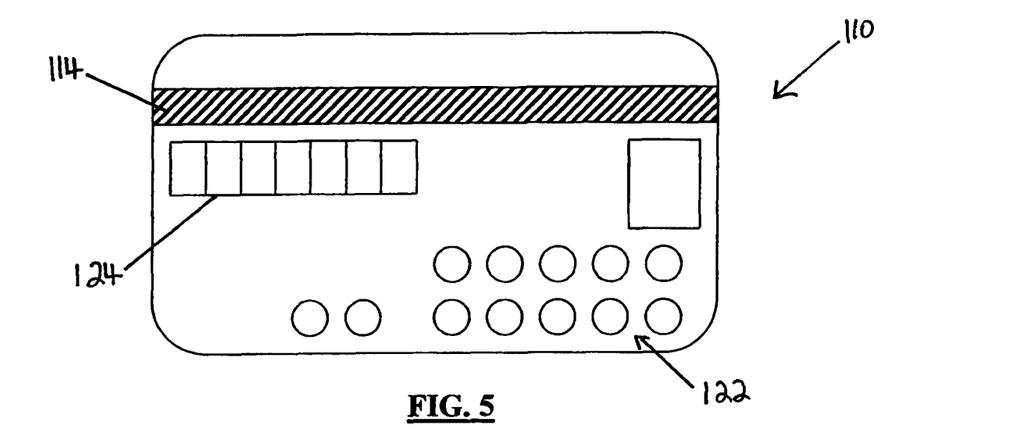
FIG. 5 is a diagrammatic plan view of a proximity smartcard in accordance with the second preferred embodiment of the invention.
Figure 6:
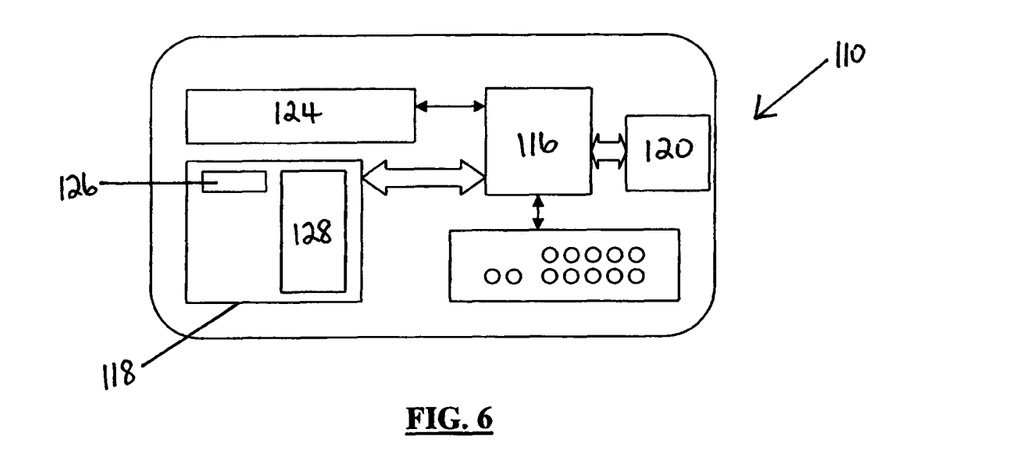
FIG. 6 is a schematic functional block diagram showing some of the components of the proximity smartcard shown in FIG. 5.

Referring to FIGS. 5 and 6, the proximity smartcard 110 in this embodiment is a proximity smart credit card that includes a rectangular-shaped flat pocket-sized body and a magnetic strip 114 that extends across the body.

The proximity smart credit card 110 also includes embedded integrated circuits, which includes a microprocessor 116 that is interfaced with peripheral microprocessor components such as memory 118, a proximity data communication interface 120, and user interface components which include a key pad 122 and display 124.

A person skilled in the art will appreciate that the microprocessor can be any suitable central processing unit (CPU), and the memory can include read only memory (ROM) for carrying an operating system and built-in programs loaded at the time the card chip is manufactured and/or configured. The memory can also include non-volatile memory such as electrically erasable programmable read only memory (EE-PROM) used for storing data and/or a microprocessor program product 128 which is executed by the processor. The proximity smart credit card 110 can further include volatile memory, such as random access memory (RAM) used for temporary storage of data.

A card operating system can also reside in the processor and memory for controlling execution of the program products, reading and writing of data to memory, and general low-level functions, such as power on and power off.

The proximity smart credit card 110 also includes a proximity data communication interface 120 that includes a radio frequency transmitter for wireless communication with a receiver of the proximity card reader 112.

Figure 8:
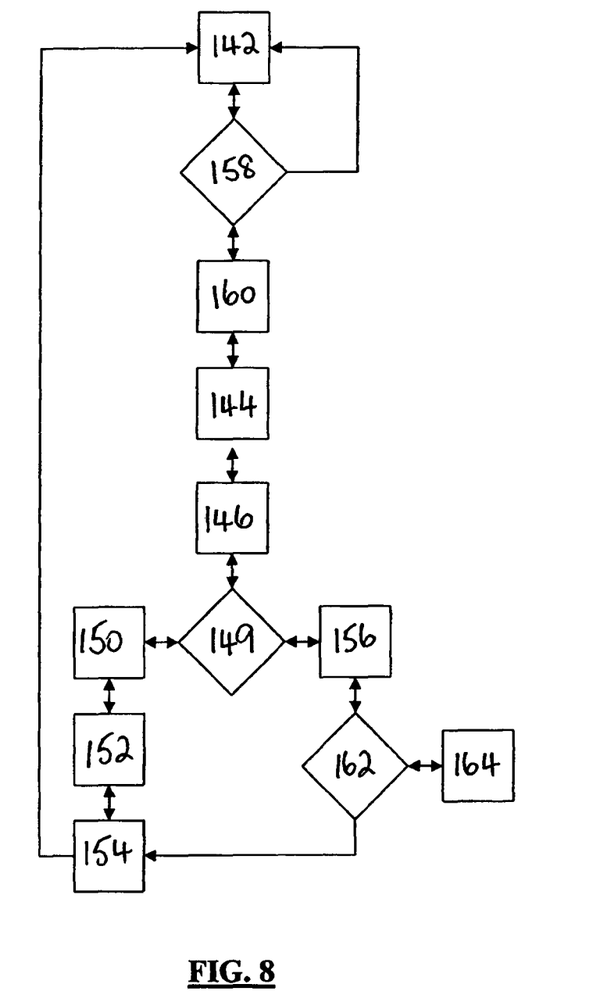
FIG. 8 shows a functional flow diagram of a microprocessor program product that forms part of the proximity smartcard in the second preferred embodiment shown in FIG. 5.

Referring to FIG. 8, a functional flow diagram 140 is shown of the microprocessor program product (card application) 128 which includes microprocessor executable instructions and which is stored in memory 118. When the card application 128 is executed it configures the proximity smart credit card 110 in a way that enables security authentication prior to transfer of stored information from the proximity smart card to the proximity card reader.

The proximity smart credit card 110 includes a one-way encrypted digest 126 that is stored in memory 118. The one-way encrypted digests 126 was created from a user personal identification number (PIN) code. The one-way encrypted digest 126 is in the form of a one-way hash value that has been generated with a one-way hash encryption algorithm and stored in memory 118 when the proximity smart credit card 110 was configured by the card issuer which in this case is a bank. It will be noted that the user PIN code is not stored on the proximity smart credit card 110, but rather a corresponding hash value of the user PIN code is stored on the proximity smart credit card 110.

When a user wishes to make a purchase transaction with the proximity smart credit card 110, then the user enters an input PIN code with the key pad 122. The proximity smart credit card 110 receives, at 142, the input PIN code.

At 158, the proximity smart credit card 110 checks if the proximity smart credit card 110 is locked or open. If the proximity smart credit card 110 is open, then, at 160, a PIN failure counter is cleared. The locked and open function of the proximity smart credit card 110 and the role of the PIN failure counter are explained in more detail below.

If the proximity smart credit card 110 is open then it displays, at 144, a command. The command can for example be the word 'WAVE' indicating to the use that the card should be waved past the proximity card reader.

The card application then determines if the entered input PIN code is valid. That is it determines if the input PIN code is actually the user PIN code or if it is an invalid PIN code that was entered, by generating, at 146, a one-way encrypted hash value of the input PIN code by using the same one-way hash algorithm that was used to generate the stored one-way hash value.

At 149, the generated one-way hash value is compared with the stored one-way hash value.

If the generated one-way hash value matches the stored one-way hash value, the entered user PIN code is the same as the user PIN code and therefore valid, in response to which the proximity smart credit card activates, at 150, the wireless interface.

When the user PIN code is validated, a timer is triggered, at 152, which when it times out, deactivates, at 154, the proximity communication interface.

Each time a user wishes to use the proximity smart credit card 110 with a proximity card reader 112, the users has to enter the user PIN to activate the proximity communication interface of the proximity smart credit card 110.

If the proximity smart credit card 110 determines, at 149, that an invalid user PIN is entered into the proximity smart credit card 110, then a PIN failure counter in memory is increased, at 156. That is, if the generated hash value of the input PIN code does not match the stored hash value. At 162, the counter is checked, and if the counter has not reached a predetermined cut-off count, then the proximity smart credit card 110 deactivates, at 154, the proximity communication interface of the proximity smart credit card 110.

If the PIN failure counter, however, has reached its predetermined count, at 162, then the proximity smartcard is locked at 164, for example the function that triggers the proximity communication interface is deactivated.

If the proximity smart credit card 110 determines, at 158, that the proximity smart credit card is actually locked when receiving an input PIN code, then another check can be performed, at 158, to reset the PIN failure counter and unlock the proximity smart credit card. That is to facilitate a function in which the user can unlock the proximity smart credit card 110.

Figure 7:
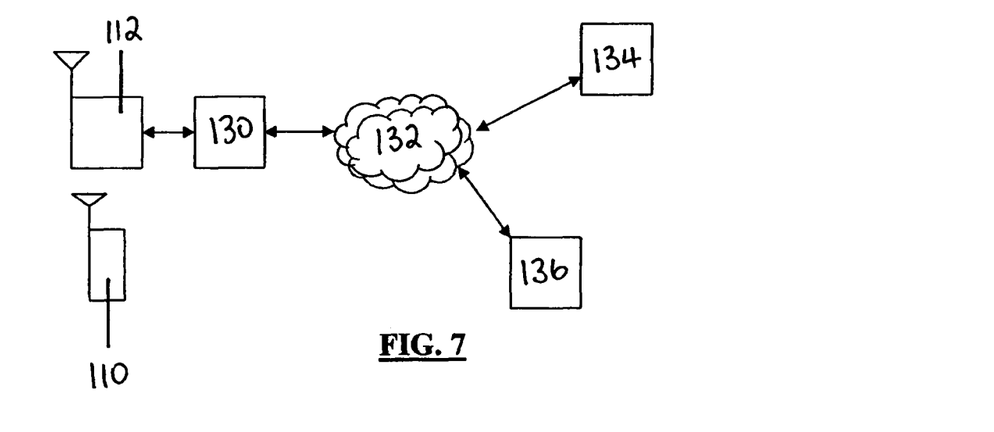
FIG. 7 is a schematic diagram of a data communication network which includes a terminal proximity card reader.

For example, a user or card holder can obtain an one-time unlock code from the card issuer, say from the bank, with a personal computer 136 over the Internet 132, after an appropriate identification check, or by any other approved method of the bank. The one-time unlock code can be entered with the code input keys 122. The one-time unlock code is then checked and processed, at 158, and if the one-time unlock code is validated, then the PIN failure counter is reset so that normal functionally of the proximity smart credit card 110 can resume.

In another embodiment (not shown) a proximity smart credit card can be configured to include a stored PIN code replacement algorithm, which when activated by entering an associated code, processes the associated code to generate a new one-way hash value for a new user PIN, which is then stored on the proximity smartcard to replace the existing one-way encrypted digest.

In this embodiment, the proximity smart credit card 110 is configured to communicate with a proximity card reader 112 in accordance with the Visa PayWave and/or MasterCard PayPass protocol.

ADVANTAGES

Advantageously, the smartcard 10 enables one-time PIN code offline security authentication with a card reader 12, which resists the risks of keystroke logging attacks.

Another advantage of the smartcard 10 is that it enables one-time PIN code security authentication independently. In other words, the one-time PIN code security authentication can be used with standard card readers 12 that are based on the EMV protocol. Therefore, the card readers 12 do not require technological changes or alterations.

The proximity smartcard 110 enables user PIN code authentication offline, thereby reducing the risk of fraudulent use of proximity smart credit cards.

VARIATIONS

It will of course be realised that white the foregoing has been given by way of illustrative example of this invention, all such and other modifications and variations thereto as would be apparent to persons skilled in the art are deemed to fall within the broad scope and ambit of this invention as is herein set forth.

Throughout the description and claims this specification the word "comprise" and variations of that word such as "comprises" and "comprising", are not intended to exclude other additives, components, integers or steps.

The invention claimed is:

1. A system for performing one-time PIN code offline security authentication, the system comprising:
a smartcard and a card reader; wherein
the smartcard comprises a smartcard memory, a smartcard user interface, a card reader-smartcard communication interface, and a smartcard microprocessor,
wherein the smartcard memory comprises a one-way encrypted digest of a user PIN code in a record in the smartcard memory accessible to a card reader through the card reader-smartcard communication interface,
wherein the smartcard user interface comprises code input keys and a display, and
wherein to perform the one-time PIN code offline security authentication in the system, the smartcard memory further comprises smartcard instructions stored in the smartcard memory, wherein the smartcard instructions, when executed by the smartcard microprocessor, cause the smartcard microprocessor to:
receive a received input PIN code from the code input keys, display a one-time PIN code on the display in response to receipt of the received input PIN code, generate an encrypted digest of the received input PIN code with an encryption algorithm, compare the encrypted digest of the received input PIN code to the one-way encrypted digest of the user PIN code stored in the smartcard memory and determine, based on this comparison, that the encrypted digest of the received input PIN code matches the one-way encrypted digest of the user PIN code stored in the smartcard memory, and, in response to determining that the encrypted digest of the received input PIN code matches the one-way encrypted digest of the user PIN code stored in the smartcard memory, temporarily store the one-time PIN code in the record in the smartcard memory accessible to the card reader through the card reader-smartcard communication interface, and interface with the card reader through the card reader-smartcard communication interface; and wherein
the card reader comprises a card reader memory, a card reader processor, the card reader-smartcard communication interface, and a card reader user interface,
wherein to perform the one-time PIN code offline security authentication in the system the card reader memory further comprises card reader instructions stored in the card reader memory, wherein the card reader instructions, when executed by the card reader processor, cause the card reader processor to:
interface with the smartcard through the card reader-smartcard communication interface, access the record in the smartcard memory accessible to the card reader through the card reader-smartcard communication interface, receive an entered PIN code through the card reader user interface, compare the entered PIN code to the one-time PIN code in the record in the smartcard memory accessible to the card reader through the card reader-smartcard communication interface to determine if the entered PIN code matches the one-time PIN code in the record in the smartcard memory accessible to the card reader through the card reader-smartcard communication interface, determine that the entered PIN code matches the one-time PIN code in the record in the smartcard memory accessible to the card reader through the card reader-smartcard communication interface, and, while the entered PIN code matches the one-time PIN code in the record in the smartcard memory accessible to the card reader through the card reader-smartcard communication interface, authenticate the one-time PIN code in the record in the smartcard memory accessible to the card reader through the card reader-smartcard communication interface.

2. The system according to claim 1, wherein the smartcard instructions, when executed by the smartcard microprocessor, further cause the smartcard microprocessor to remove the one-time PIN code from the record in the smartcard memory accessible to the card reader through the card reader-smartcard communication interface after the smartcard microprocessor determines that a condition has occurred.

3. The system according to claim 2, wherein the condition comprises at least one of lapse of a span of time, deactivation of the display, or detection that the one-time PIN has been used in an authentication process.

4. The system according to claim 1, wherein the smartcard memory is further adapted to store a PIN failure counter, and the smartcard instructions further cause the smartcard microprocessor to increase the PIN failure counter in the smartcard memory when the encrypted digest of the input PIN code does not match the stored one-way encrypted digest of the user PIN code.

5. The system according to claim 4, wherein the smartcard instructions, when executed by the smartcard microprocessor, further cause the smartcard microprocessor to lock or deactivate at least some functionality when the PIN failure counter reaches a predetermined count.

6. The system according to claim 5, wherein the smartcard instructions, when executed by the smartcard microprocessor, further cause the smartcard microprocessor to detect input into the code input keys of a one-time unlock code, process and validate the one-time unlock code, and unlock or reactivate a locked or deactivated function of the smartcard.

7. The system according to claim 4, wherein the smartcard instructions, when executed by the smartcard microprocessor, further cause the smartcard microprocessor to reset the PIN failure counter to zero when a valid PIN code is entered prior to the PIN failure counter reaching a predetermined count.

8. The system according to claim 1, wherein the smartcard instructions, when executed by the smartcard microprocessor, further cause the smartcard microprocessor to detect entry of an invalid PIN code into the code input keys and update the record in the smartcard memory accessible to the card reader through the card reader-smartcard communication interface to an invalid value.

9. The system according to claim 1, wherein the smartcard instructions comprise a stored PIN code replacement function, and wherein the stored PIN code replacement function causes the smartcard microprocessor, when executed by the smartcard microprocessor, to detect an associated code, process the associated code to generate a new one-way encrypted digest of a new user PIN code, and replace the one-way encrypted digest of the user PIN code with the new one-way encrypted digest of the new user PIN code.

10. The system according to claim 1, wherein the smartcard is a smart credit card.

11. The system according to claim 1, wherein the smartcard communicates with the card reader through the card reader-smartcard communication interface in accordance with at least one of a Europay, MasterCard and VISA (EMV) protocol.

12. The system according to claim 1, wherein the card reader user interface comprises a PIN code entry device.

13. The system according to claim 1, wherein the card reader-smartcard communication interface comprises an input/output contact terminal.

14. A method for performing one-time PIN code offline security authentication, the method comprising:
with a microprocessor of a smartcard,
receiving a received input PIN code from code input keys of the smartcard,
displaying a one-time PIN code on a display of the smartcard in response to receipt of the received input PIN code,
generating an encrypted digest of the received input PIN code with a one-way encryption algorithm, wherein the one-way encryption algorithm is the one way encryption algorithm used to prepare a one-way encrypted digest of a user PIN code and wherein a memory of the smartcard comprises the one-way encrypted digest of the user PIN code,
determining that the encrypted digest of the received input PIN code matches the one-way encrypted digest of the user PIN code stored in the memory of the smartcard by comparing the encrypted digest of the received input PIN code to the one-way encrypted digest of the user PIN code stored in the memory of the smartcard,
in response to determining that the encrypted digest of the received input PIN code matches the one-way encrypted digest of the user PIN code stored in the memory of the smartcard, temporarily storing the one-time PIN code in a record in the smartcard memory accessible to a card reader through a card reader-smartcard communication interface, and
interfacing with the card reader through the card reader-smartcard communication interface; and
with a microprocessor of the card reader,
interfacing with the smartcard through the card reader-smartcard communication interface,
accessing the record in the smartcard memory accessible to the card reader through the card reader-smartcard communication interface,
receiving an entered PIN code through a card reader user interface of the card reader,
comparing the entered PIN code to the one-time PIN code in the record in the smartcard memory accessible to the card reader through the card reader-smartcard communication interface,
determining, based on this comparison, that the entered PIN code matches the one-time PIN code in the record in the smartcard memory accessible to the card reader through the card reader-smartcard communication interface, and,
while the entered PIN code is determined to match the one-time PIN code in the record in the smartcard memory accessible to the card reader through the card reader-smartcard communication interface, authenticating the one-time PIN code in the record in the smartcard memory accessible to the card reader through the card reader-smartcard communication interface.

15. The method according to claim 14, further comprising, with the microprocessor of the smartcard, setting the record in the smartcard memory accessible to the card reader through the card reader-smartcard communication interface to an invalid value after at least one of passage of a span of time, deactivation of the display of the smartcard, or detection that the one-time PIN has been used in an authentication process.

16. The method according to claim 14, wherein the smartcard memory further comprises a PIN failure counter and the method further comprises, with the smartcard microprocessor, increasing the PIN failure counter when the encrypted digest of the received input PIN code does not match the encrypted digest of the user PIN code.

17. The method according to claim 14, wherein the smartcard memory further comprises a PIN failure counter, the method further comprising, with the smartcard microprocessor, setting the record in the smartcard memory accessible to the card reader through the card reader-smartcard communication interface to an invalid value when an invalid PIN code is entered with the code input keys.

18. The method according to claim 14, further comprising, with the smartcard microprocessor, detecting a PIN replacement code from code input keys of the smartcard, wherein the PIN replacement code is associated with an instruction to generate a new encrypted digest of the received user PIN code, generating a new encrypted digest of the user PIN code, and replacing the encrypted digest of the received user PIN code with the new encrypted digest of the received user PIN code.

19. The method according to claim 14, wherein the card reader user interface comprises a PIN code entry device, wherein the PIN code entry device comprises a keypad.

20. The method according to claim 14, wherein the card reader-smartcard communication interface comprises an input/output contact terminal.

* * * * *